(12) United States Patent
Aveldson et al.

(10) Patent No.: US 7,857,251 B2
(45) Date of Patent: Dec. 28, 2010

(54) FILM LAMINATION VEHICLES AND METHODS

(75) Inventors: Jason L. Aveldson, Prior Lake, MN (US); Conrad V. Anderson, Minneapolis, MN (US); H. Aaron Christmann, White Bear Lake, MN (US); Anne M. DePalma, Chisago City, MN (US); Brian T. Loesch, Hastings, MN (US); Chin-Yee Ng, Maplewood, MN (US); Justin W. Wilhelm, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 743 days.

(21) Appl. No.: 11/576,956

(22) PCT Filed: Oct. 12, 2005

(86) PCT No.: PCT/US2005/036260

§ 371 (c)(1),
(2), (4) Date: Apr. 10, 2007

(87) PCT Pub. No.: WO2006/044271

PCT Pub. Date: Apr. 27, 2006

(65) Prior Publication Data

US 2007/0277932 A1    Dec. 6, 2007

Related U.S. Application Data

(60) Provisional application No. 60/617,896, filed on Oct. 12, 2004.

(51) Int. Cl.
*B32B 37/00* (2006.01)
*E04D 15/00* (2006.01)
*E04D 15/06* (2006.01)

(52) U.S. Cl. .............. 242/577; 156/358; 156/494; 156/495; 156/496; 156/523; 156/574

(58) Field of Classification Search .......... 156/358, 156/494–496, 523, 574, 577, 580
See application file for complete search history.

(56) References Cited

U.S. PATENT DOCUMENTS 4,047,445 A    9/1977  Anderson (Continued)

FOREIGN PATENT DOCUMENTS

EP     0 270 732 A    6/1988

(Continued)

OTHER PUBLICATIONS

U.S. Appl. No. 60/617,754, Paiva, filed Oct. 12, 2004.

*Primary Examiner*—Khanh Nguyen
*Assistant Examiner*—Carson Gross
(74) *Attorney, Agent, or Firm*—David B. Patchett

(57) ABSTRACT

Film lamination vehicles and methods that can be used to laminate films to surfaces are disclosed. The vehicles and methods use a moving lamination device that forms a lamination front over which the film is applied to the surface. The lamination front complies to irregularities in the surface such as dips, bumps, etc. while providing substantially uniform pressure such that the film conforms to the surface.

14 Claims, 11 Drawing Sheets

U.S. PATENT DOCUMENTS

| | | | | |
|---|---|---|---|---|
| 4,460,433 A | * | 7/1984 | Boyd | 156/574 |
| 5,257,965 A | | 11/1993 | Fuchs et al. | |
| 5,439,540 A | * | 8/1995 | Lippman et al. | 156/71 |
| 5,454,897 A | * | 10/1995 | Vaniglia | 156/166 |
| 5,785,760 A | | 7/1998 | Sconyyers et al. | |
| 6,105,648 A | * | 8/2000 | De Graaf et al. | 156/421 |
| 6,484,781 B2 | * | 11/2002 | Weaver | 156/577 |

FOREIGN PATENT DOCUMENTS

| FR | 2 689 151 A | 10/1993 |
|---|---|---|
| FR | 2 718 164 A | 10/1995 |

* cited by examiner

FILM LAMINATION VEHICLES AND METHODS

CROSS REFERENCE TO RELATED APPLICATIONS

This application is a national stage filing under 35 U.S.C. 371 of PCT/US2005/036260 filed Oct. 12, 2005, which claims priority to U.S. Provisional Application No. 60/617,896: filed Oct. 12, 2004, the disclosure of which is incorporated by reference in its/their entirety herein.

Adhesive-backed films may be used to add or modify coloration or otherwise decorate a surface, and to create visual graphics or messages upon them, such as patterns, symbols, logos, pictographs, graphs, pictures, and written messages for a myriad of purposes such as motivational phrases, warnings, directions, and advertising. In some instances, adhesive backed films may be used to protect an underlying surface.

Conventional pressure sensitive adhesive backed films are often applied by hand with the aid of simple tools. Issues associated with hand application of pressure sensitive adhesive backed films to large areas may include maintaining a consistently high quality application over an entire application area while completing the project in a reasonable amount of time and for a reasonable cost.

SUMMARY OF THE INVENTION

The present invention provides film lamination vehicles and methods that can be used to laminate adhesive-backed films to surfaces. The vehicles and methods use a moving lamination device that forms a lamination front over which the film is applied to the surface. The lamination front preferably complies to irregularities in the surface such as dips, bumps, etc. while providing substantially uniform pressure across the lamination front, preferably over the entire width of the film.

In various embodiments, the vehicles and methods of the present invention may achieve gross compliance to undulations in the surface through relative displacement between segmented bodies and/or bending of the lamination device. As a result, the size of the contact area forming the lamination front may preferably remain small, allowing high contact pressures to be exerted uniformly across the film width with relatively low loading.

One potential advantage that may be obtained in connection with the vehicles and methods of the present invention may preferably include a reduction or elimination of lamination defects (e.g., bubbles, wrinkles, etc.). Another potential advantage may include a fast, labor-saving lamination—particularly as compared to hand lamination processes.

Although the lamination vehicles and methods of the present invention may find use in laminating films to floors, the vehicles and methods may also be used to laminate adhesive-backed films to other surfaces such as, e.g., sidewalks, driveways, parking lots, walls, countertops, flooring materials, dry-erase boards, roads, tabletops, whiteboards, windows, shelves, patios, ceilings, stairs, etc.

As used herein, a lamination "vehicle" is an lamination apparatus adapted to be moved across a surface to which a film is to be laminated. In other words, the lamination vehicles of the present invention can be distinguished from stationary lamination apparatus in which the surfaces to be laminated are delivered to the stationary lamination apparatus. In some embodiments, the lamination vehicles of the invention may be self-propelled lamination vehicles that include one or more driven surface-engaging devices such as wheels, tracks, rolls, belts, etc. such that the lamination devices are propelled across the surfaces to which the films are laminated by the one or more driven surface-engaging devices. Other embodiments of lamination vehicles according to the present invention may be pushed or pulled across the surface to which the film is to be laminated by a person, winch, etc., i.e., although such vehicles may include surface-engaging devices, the motive force for the vehicle is not provided through the surface-engaging devices.

The adhesive-backed films may be laminated to a surface to provide protection to the underlying surface, for aesthetic purposes, and/or to convey information. The films may be transparent, translucent, opaque, combinations thereof, etc. The films may enhance friction to, e.g., improve skid-resistance. In other instances, the films may exhibit a reduced coefficient of friction if so desired for, e.g., bowling lanes, etc. Examples of some suitable films that may be used in connection with the vehicles and methods of the present invention may be described in, e.g., U.S. Patent Application Ser. No. 60/617,754, titled "Protective Films and Related Methods" and filed on even date herewith.

The adhesives on the films may be of any suitable type, e.g., pressure-sensitive, pressure-activated, heat-activated, water-activated, curable, etc. In the case of heat-activated adhesives, the lamination vehicles of the present invention may include heating components (e.g., heat lamps, electrical resistance heaters, hot air guns, heated rolls, etc.) to heat the adhesive either before or after the adhesive contacts the surface to which the film is to be laminated. In the case of water-activated adhesives, the lamination vehicles of the present invention may include water reservoirs, spray heads, etc. to provide water for activating the adhesive. In the case of curable adhesives, the lamination vehicles of the present invention may include actinic radiation sources if the curing mechanism of the adhesive requires actinic radiation for curing.

In one aspect, the present invention provides a film lamination vehicle that includes a frame; one or more driven surface-engaging devices operably connected to the frame for driving the film lamination vehicle across a surface; a supply roll spindle supported by the frame; a lamination device operably attached to the frame, wherein the lamination device defines a lamination front on the surface; and a web path within the apparatus, wherein the web path extends between the supply roll spindle and the lamination device.

In another aspect, the present invention provides a lamination device that includes a support spindle; a plurality of roll segments arrayed along a length the support spindle, wherein each roll segment of the plurality of roll segments rotates about the support spindle, and wherein each roll segment of the plurality of roll segments has an; interior surface facing the support spindle and an exterior compliant surface facing away from the support spindle; a plurality of movable pistons extending outward from the support spindle, wherein an outer end of each movable piston of the plurality of movable pistons acts on the interior surface of at least one roll segment of the plurality of roll segments; and a fluid chamber comprising a fixed volume and fluid located therein, wherein at least a portion of the fluid chamber is located within the support spindle, and wherein pressure of the fluid located within in the fluid chamber biases the plurality of movable pistons in a direction towards the interior surfaces of the plurality of roll segments during lamination.

In another aspect, the present invention provides a lamination device that includes a support spindle; a plurality of roll segments arrayed along a length the support spindle, wherein each roll segment of the plurality of roll segments rotates about the support spindle, and wherein each roll segment of the plurality of roll segments has an interior surface facing the support spindle and an exterior compliant surface facing away from the support spindle; and a plurality of biasing members extending outward from the support spindle, wherein an outer end of each biasing member of the plurality of biasing members acts on the interior surface of at least one roll segment of the plurality of roll segments.

In another aspect, the present invention provides a lamination device that includes a compliant member with a length and a contact surface extending along the length of the compliant member; a plurality of biasing members arranged along the length of the compliant member, wherein each biasing member of the plurality of biasing members acts on the compliant member such that the contact surface is biased in a direction generally transverse to the length of the compliant member, and wherein each biasing member acts on the compliant member independently of the other biasing members.

In another aspect, the present invention provides a film lamination vehicle that includes a frame; one or more surface-engaging devices operably connected to the frame and supporting the frame above a surface; a supply roll spindle supported by the frame; a lamination device operably attached to the frame, wherein the lamination device defines a lamination front on the surface. The lamination device includes a compliant member having a length and a contact surface coextensive with the lamination front; a plurality of biasing members arranged along the length of the compliant member, wherein each biasing member of the plurality of biasing members acts on the compliant member such that the contact surface is biased in a direction generally transverse to the length of the compliant member, and wherein each biasing member acts on the compliant member independently of the other biasing members.

In another aspect, the present invention provides a method of laminating an adhesive-backed film to a surface. The method includes delivering an adhesive-backed film to a surface, wherein adhesive is located on the film between the film and the surface; forming a lamination front using a lamination device, wherein the film is pressed against the surface along the lamination front; and advancing the lamination front across the surface and the film; wherein the lamination front includes a plurality of lamination zones aligned across the lamination front, wherein each lamination zone exerts a substantially uniform force on the film along the lamination front, and wherein a first portion of the lamination device forming the lamination front is capable of moving in an out of plane direction relative to the surface separately from a second portion of the lamination device.

These and other features and advantages of the present invention may be described below in connection with various exemplary embodiments of the invention.

BRIEF DESCRIPTIONS OF THE FIGURES

DESCRIPTION OF EXEMPLARY EMBODIMENTS OF THE INVENTION

Figure 1:
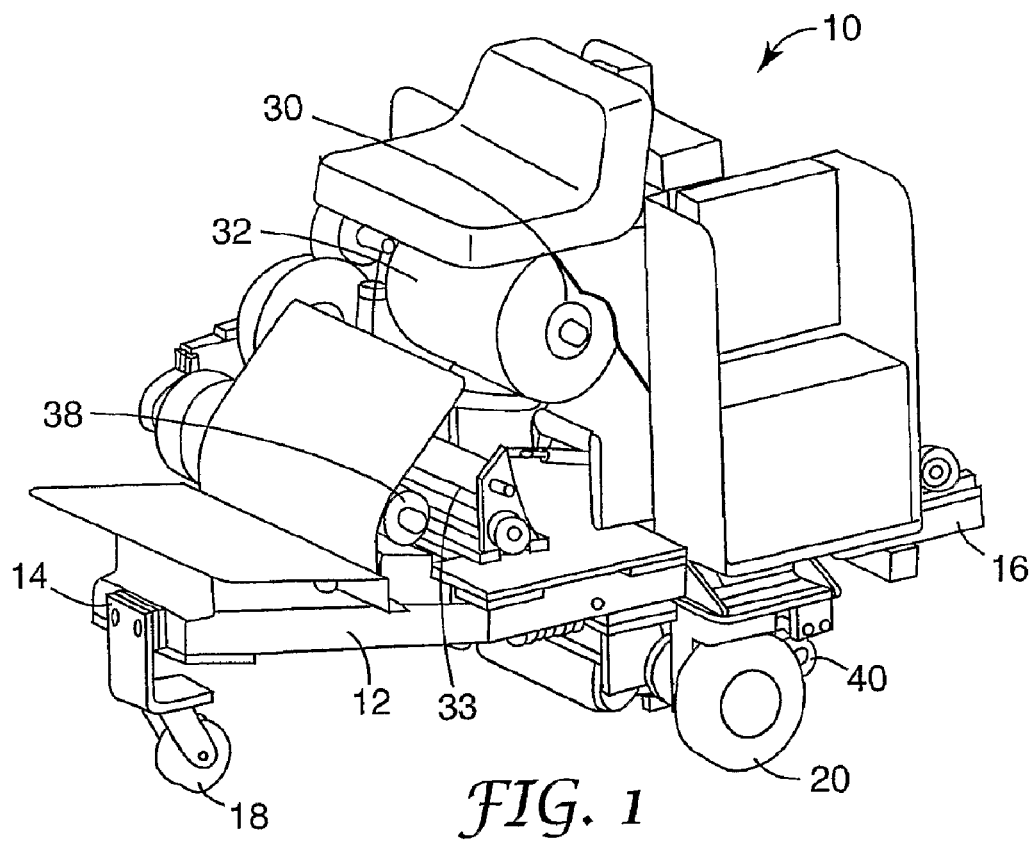
FIG. 1 is a downwardly looking perspective view of one exemplary self-propelled lamination vehicle according to the present invention.

In the following detailed description of exemplary embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

The present invention provides film lamination vehicles and methods that can be used to apply adhesive-backed films to surfaces. The lamination vehicles and methods use a lamination device that forms a lamination front over which the film is applied to the surface. The lamination front preferably complies to irregularities in the surface such as dips, bumps, etc. while providing pressure such that the film conforms to the surface, preferably over its entire width.

Figure 3:
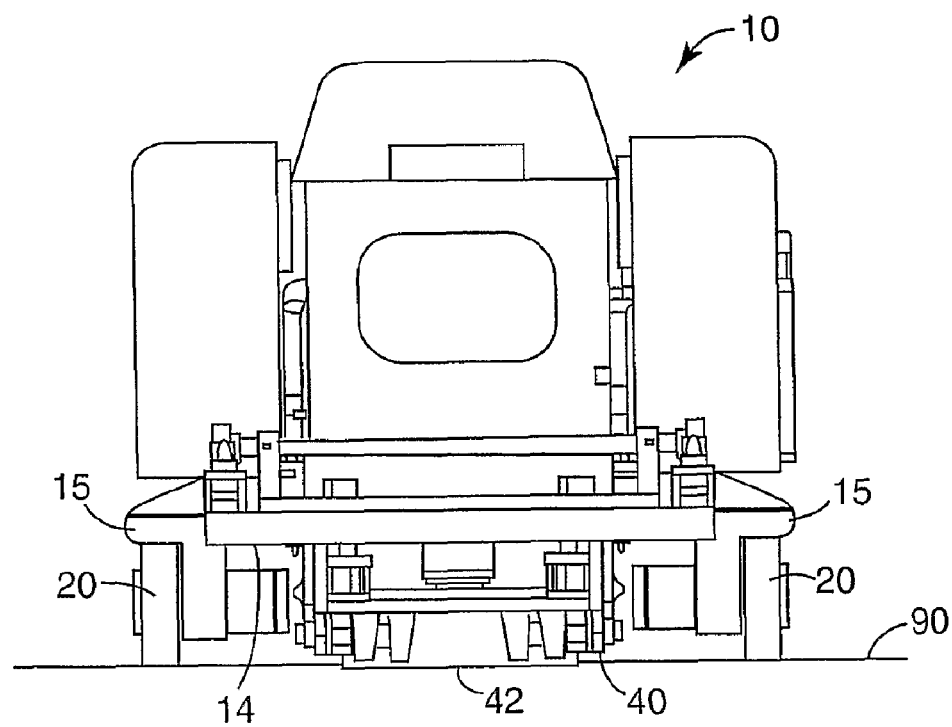
FIG. 3 is a rear view of the vehicle of FIG. 1.
Figure 2:
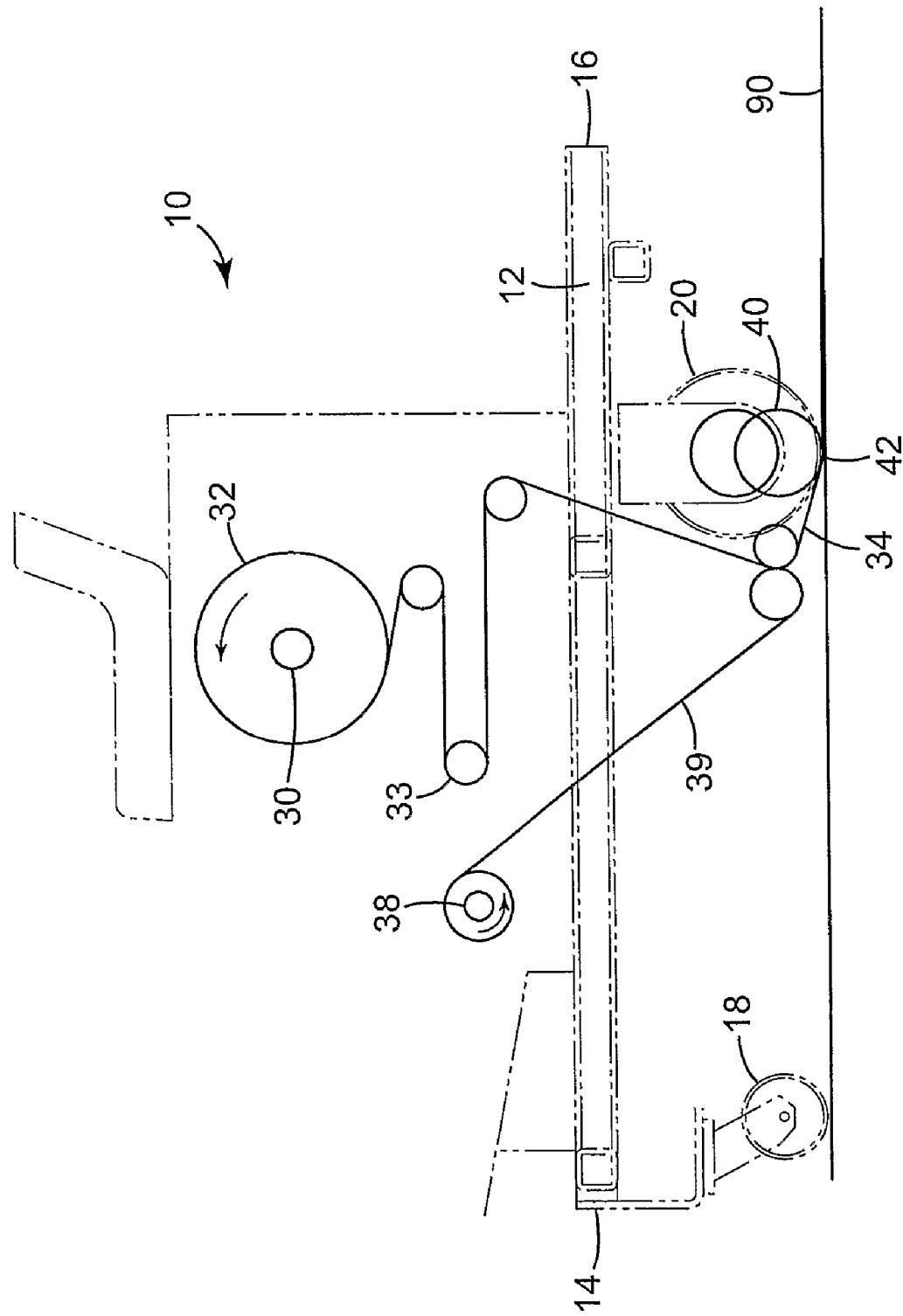
FIG. 2 is a simplified side view of the vehicle of FIG. 1 depicting a web path through the vehicle.

One exemplary embodiment of a lamination vehicle of the present invention is depicted in FIGS. 1-3. The vehicle 10 includes a frame or chassis 12; driven wheels 20 and a front caster 14 supporting the frame 12 above the surface 90, a supply roll spindle 30 supporting a supply roll 32, and a lamination device 40. The lamination device depicted in FIGS. 1-3 is in the form of a roll, although other lamination devices (some of which are described herein) could be used in connection with vehicle 10.

In operation, an adhesive-backed film is provided in roll form as supply roll 32 on supply roll spindle 30. The film is unwound from the supply roll 32 and directed between the lamination device 40 and the surface 90. It is at that point that a lamination front 42 is formed. The lamination front 42 is that line along which the adhesive on the film 34 is forced against the surface 90 by the lamination device 40. In the case of pressure-sensitive or pressure-activated adhesives, the force along the lamination front 42 may preferably be sufficient to adhere the film 34 to the surface 90.

Typically, the lamination front 42 will be generally straight line that is generally perpendicular to the longitudinal axis defined by the length of the film, although in some instances the lamination front 42 may not be a generally straight line and/or it may not be generally perpendicular to the longitudinal axis of the film.

The supply roll spindle 30 may be of any suitable design that provides support for the roll 32 of film. It may be preferred that the spindle be cantilevered as depicted. It may further be preferred that the spindle 30 include a brake or other mechanism such that the tension of the film 34 as it unwinds from roll 32 can be controlled. The vehicle 10 may also preferably include a rewind spindle 38 to collect a liner 39 that may be provided on the film 34 to protect an adhesive located on one surface thereof.

The depicted vehicle 10 includes an optional web tension control device in the form of a dancer system 33 to provide additional control over the tension of the film 34 as it is delivered to the lamination device 40. Other techniques of controlling web tension will be known to those skilled in the art of web handling.

The frame 12 of lamination vehicle 10 includes a front end 14, a back end 16, and opposing sides 15. The frame 12 can take any suitable shape and be made from any suitable material or combination of materials so long as it is capable of supporting the components of vehicle 10 above the surface 90. Examples of suitable materials may include, e.g., metals, polymers, composites, etc. The caster 18 in the depicted embodiment is provide to support the front end 14 of the frame 12 above the surface 90 and may preferably be a freely-rotating caster wheel or any suitable equivalent capable of supporting the front end 14 of the frame 12.

The driven wheels 20 also preferably help to support the frame 12 above a surface 90 and provide the motive force used to move the vehicle 10 over the surface 90. In the depicted embodiment, the driven wheels 20 are located at opposite ends of the lamination device 40 such that rotation of the driven wheels 20 moves the vehicle 10 along the surface 90. Although the depicted embodiment uses wheels 20 to support the frame 12 above the surface 90 and provide the motive force, it should be understood that any suitable equivalent surface-engaging devices could be used in place of wheels, e.g., tracks, driven lamination roll(s), etc.

The driven wheels 20 may be operatively connected to a drive system or systems as desired. In the depicted embodiment, the driven wheels 20 are driven using separate motors operably connected to each driven wheel 20. Alternatively, both of the driven wheels 20 could be driven using a single motor and a differential drive gearbox or other system to deliver power to and adjust the drive speed ratio between the two driven wheels 20. It may be preferred that the driven wheels 20 be capable of only forward motion to reduce the chances of introducing wrinkles into the film being applied to the surface 90.

The motor or motors used to drive the vehicle 10 may take any suitable form, e.g., electric motors, internal combustion motors, hydraulic motors, air motors, etc. It may be preferred that the vehicle 10 be independent of any energy source, i.e., that it derive its power from on-board power supplies, such as batteries, fuel tanks, pressurized tanks, etc.

The driven wheels 20 may preferably be located proximate opposing ends of the lamination device 40. Locating the driven wheels 20 at opposing ends of the lamination device 40 may assist in providing steering ability to the vehicle 10 while reducing the likelihood of wrinkling the film as it is applied to the surface 90.

Figure 4:
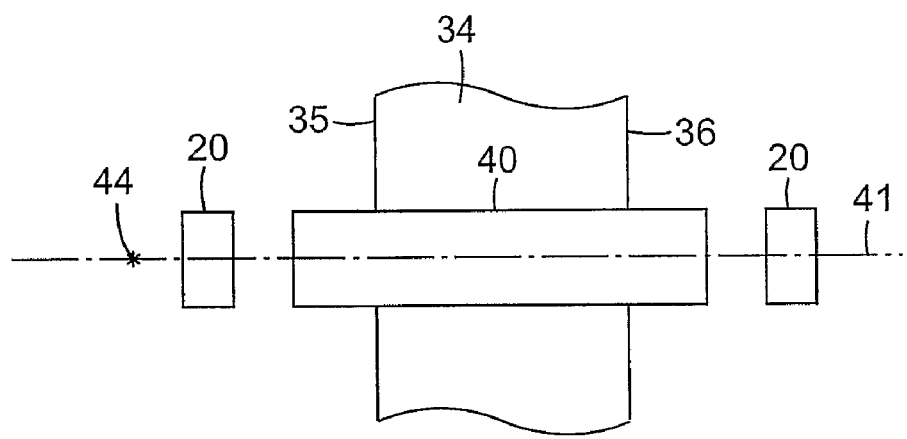
FIG. 4 is a schematic diagram of the steering in the vehicle of FIG. 1.

Steering of the lamination vehicles of the present invention may play a significant role in the lamination of films to a surface without any or with minimal wrinkles. FIG. 4 is a schematic diagram illustrating the steering of lamination device 40 (in the form of a roll) using driven wheels 20 located at opposite ends of a roll lamination device 40. FIG. 4 also depicts a portion of a film 34 being laminated to the surface 90, where the film 34 includes edges 35 and 36 that define the width of the film 34.

In the depicted vehicle, the lamination device 40 preferably defines a lamination front 42 that extends along an axis 41. In addition, the driven wheels 20 are preferably mounted such that their axes of rotation lie in or near the plane perpendicular to the surface that contains the lamination front 42 (and longitudinal axis 41). As the vehicle 10 is steered, it may be preferred that the lamination front 42 as defined by the lamination device 40 rotates about a steering pivot point 44 that is located outside of the width of the film 34. In other words, the steering pivot point 44 may preferably be located on film edges 35 or 36 or outside of the width of the film 34, but the steering pivot point 44 is preferably not located between the edges 35 and 36 of the film 34. If the vehicle 10 is driven such that only forward motion is allowed and the steering is limited as described herein, wrinkles in the film 34 as applied to the surface 90 can preferably be prevented (or at least reduced).

Although the depicted embodiment includes two driven wheels located outside of the edges of the film being laminated to the surface, any steering/drive system that results in the steering pivot point being located on the edge or outside of the film could be substituted for that depicted in FIG. 4.

Figure 4A:
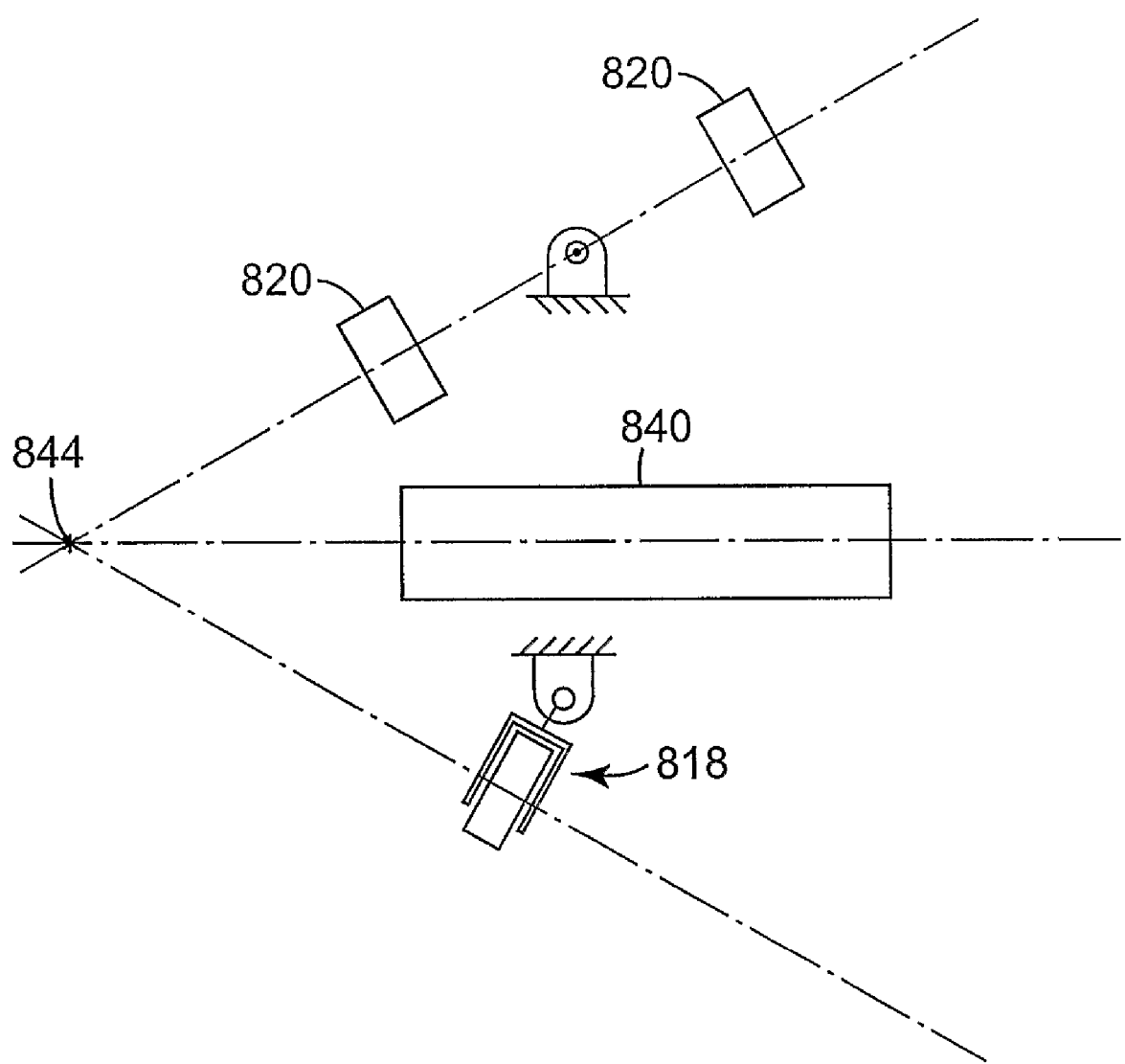
FIG. 4A is a schematic diagram of another lamination vehicle steering system.

In the exemplary embodiment depicted in FIG. 4A, for example, it may be preferred to provide a lamination vehicle that includes two steered wheels 820 that are located inside the width of a lamination device 840. The vehicle may also include a caster 818 located such that the lamination device 840 is located between the steered wheels 820 and the caster 818. In addition, the steered wheels 820 are preferably steered such that the steering pivot point 844 of the lamination vehicle is located outside of the width of a film being applied by the lamination device 840. In the depicted embodiment, the steering pivot point 844 is located outside of the width of the lamination device 840. A potential advantage of locating wheels, casters, etc., within the width of the lamination device 840 is that the edges of the lamination device 840 may be driven closer to obstructions such as walls, etc.

In another example, the caster 18 located at the front end 14 of the vehicle 10 could be replaced by a driven wheel, with the wheels 20 being free-wheeling, i.e., the motive force could be provided using a wheel that replaced the caster 18 while the wheels 20 on each end of the lamination device 40 do not provide the motive force. The steering range of the front driven wheel in such a vehicle may need to be limited to place the steering pivot point of the lamination device outside of the film as described above.

In still another example, the vehicle described in the preceding paragraph (one in which the caster 18 is replaced with a driven wheel that provides the motive force to the vehicle) could be operated in reverse. In other words, the driven wheel that replaces caster 18 could be operated such that the driven wheel is located behind the lamination device 40 such that the driven wheel traverses the film after it has been laminated to the surface 90.

In yet another example of a lamination vehicle with an alternate drive/steering system, a lamination vehicle according to the present invention may include a driven roll serving as a lamination device and also providing the motive force for the lamination vehicle. In such a lamination vehicle, the steering may preferably be provided separately from the roll that serves as the lamination device and the motive force. It may further be preferred that the steering be limited or controlled such that the steering pivot point about which the lamination device/lamination front rotates be located outside of the width of the film being laminated to the surface.

Figure 5:
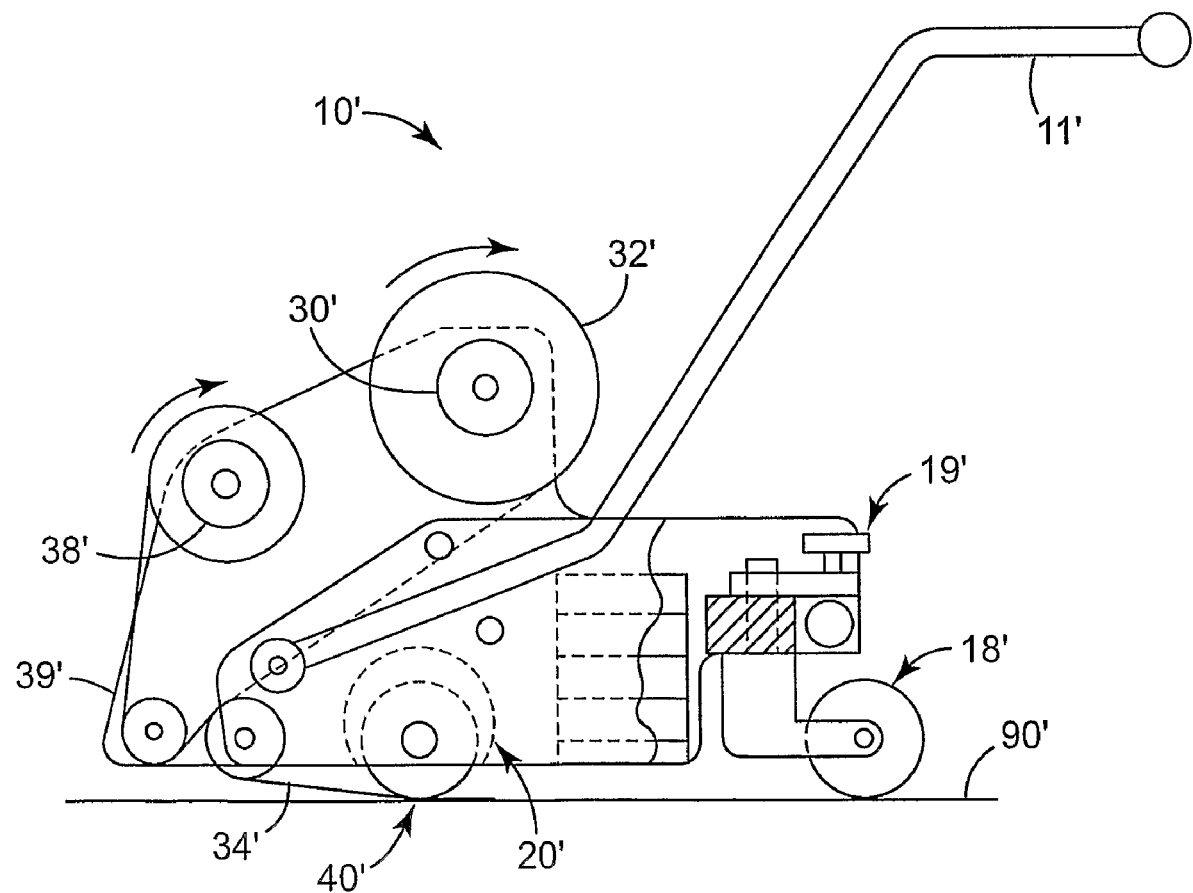
FIG. 5 is a side view of another exemplary embodiment of a lamination vehicle according to the present invention.

One further example of a lamination vehicle according to the present invention is depicted in FIG. 5. As seen there, the lamination vehicle 10' does not include any driven wheel or wheels that provide the motive force to move the vehicle 10' over the surface 90'. Rather, the lamination vehicle 10' is designed such that an operator pushes handle 11' to provide the motive force for the vehicle 10'.

The vehicle 10' preferably includes a lamination device 40' in the form of a lamination roll and may also include wheels 20' on opposite ends of the lamination roll. A supply roll spindle 30' is provided to support a supply roll 32' of an adhesive backed film. The film is unwound from the supply roll 32' and directed between the lamination device 40' and the surface 90'. The vehicle 10' may also preferably include a rewind spindle 38' to collect a liner 39' that may be provided on the film 34' to protect an adhesive located on one surface thereof.

The vehicle 10' may also preferably include a steering limit mechanism 19' in connection with caster 18' that limits the degree to which an operator can turn the vehicle 10' during operation. Limiting the degree to which the vehicle can be turned during operation may preferably cause the steering pivot point of the lamination device/lamination front to be located outside of the width of the film along the lamination front. The steering limit mechanism 19' may take many different forms, with the depicted limit mechanism 19' in the form of a pin that seats in a bore to limit rotation of the caster 18'.

Although some exemplary embodiments of lamination vehicles, drive systems for lamination vehicles, and steering systems for lamination vehicles may be described herein, many other variations in lamination vehicles, drive systems, and steering systems may also be envisioned and the invention should not be limited to the lamination vehicles, drive systems, and steering systems described herein.

Lamination Devices

The lamination devices used in lamination vehicles of the present invention may take a variety of forms. Typically, though, the lamination devices will apply a band of preferably uniform contact pressure over the width of a lamination front. The pressure used in lamination may preferably be directed perpendicular to the surface. When used to laminate films to surfaces that may not be perfectly flat (e.g., floors, walls, etc.), the lamination devices are preferably capable of compensating for unevenness in the surface to which the film is laminated.

In some embodiments, the lamination device used in lamination vehicles of the present invention may take the form of a conventional roll that may preferably have a compliant outer surface of, e.g., an elastomeric material. Such lamination rolls are well known to those skilled in the art.

Another class of lamination devices that may be useful in connection with the present invention may preferably develop a lamination front in which multiple lamination zones are arrayed across the lamination front. The lamination front developed by the lamination zones of the lamination device is preferably capable of complying with undulations or irregularities in the height of the surface to which the film is being laminated. In addition, the lamination pressure within each lamination zone may preferably be essentially uniform across the lamination front in spite of undulations or irregularities in the surface to which the film is being laminated.

In another manner of characterizing this aspect of the present invention, the lamination front may include, e.g., multiple lamination zones aligned across the lamination front, wherein each lamination zone exerts a substantially uniform force on the film along the lamination front, and wherein a first portion of the lamination device forming the lamination front is capable of moving in an out of plane direction (relative to a plane defined by the surface) separately from a second portion of the lamination device. By "substantially uniform force" it is meant that the force exerted by the different lamination zones is substantially the same from zone to zone across the lamination front.

Figure 6:
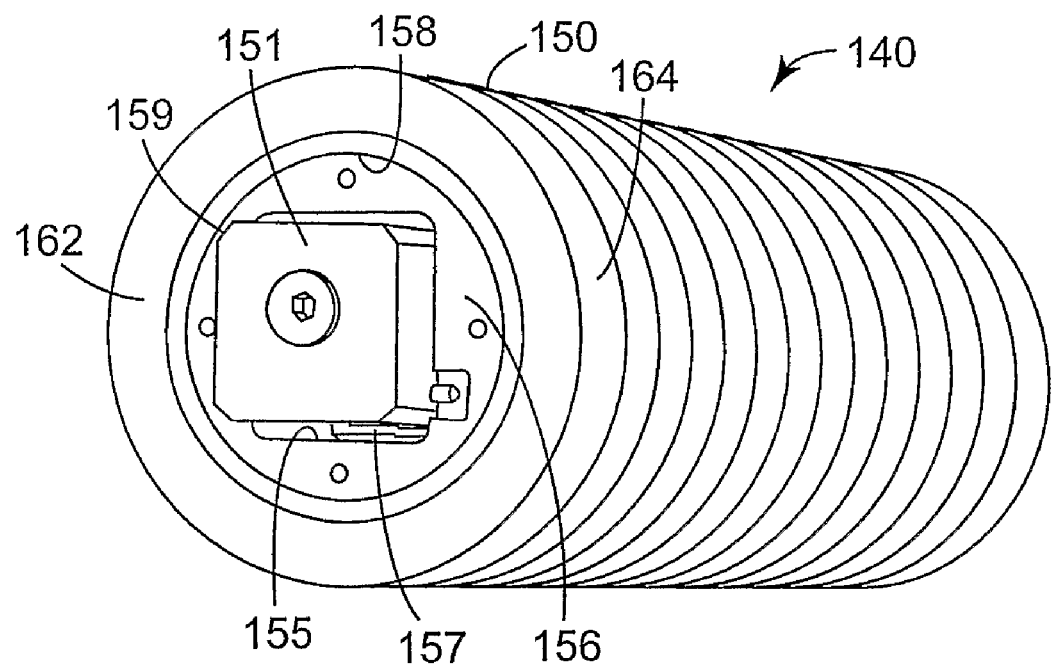
FIG. 6 is a perspective view of a lamination device including roll segments aligned along a support spindle.
Figure 7:
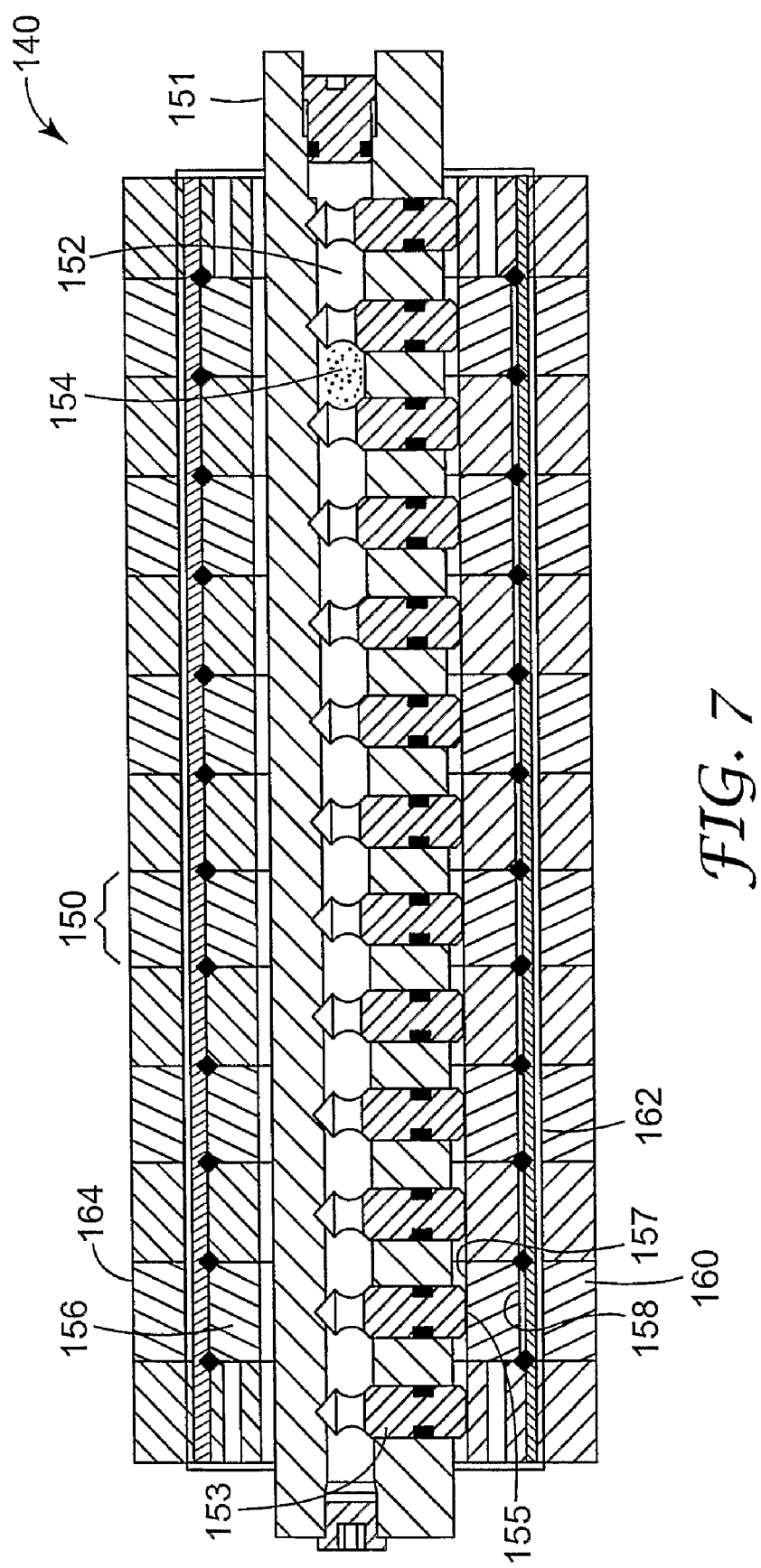
FIG. 7 is a cross-sectional view of the lamination device of FIG. 6 taken along the longitudinal axis of the support spindle.

One embodiment of a lamination device 140 depicted in FIGS. 6 & 7 includes roll segments 150 aligned along a support spindle 151. As depicted in FIG. 7, the support spindle 151 includes a fluid chamber 152 and a series of movable pistons 153 that are biased outwardly from the fluid chamber 152 by the pressure of fluid 154 located within the fluid chamber 152.

Lamination forces that urge the lamination device against a surface are delivered to the lamination device 140 by any suitable mechanism (e.g., hydraulic pistons, air pistons, mechanical springs, etc.). Fluid pressure in the fluid chamber 152 is produced by the lamination forces delivered to the lamination device 140. Typically, the lamination forces operate on the ends of the spindle 151. Further, the support spindle 151 may preferably be maintained in a position in which the spindle 151 is generally parallel to the surface against which the roll segments 150 operate. Although the support spindle 151 preferably includes the fluid chamber 152, it is preferably rigid enough to support the roll segments 150 under the lamination pressures with an acceptable amount of deflection.

Each roll segment 150 in the depicted design includes a cylindrical inner body 156 with inner surface 157 facing the support spindle 151 and an outer surface 158 facing away from the support spindle 151. The outer surface 158 of the cylindrical inner body 156 preferably has a fixed diameter. Needle bearings 159 are located between the outer surface 158 of inner body 156 and cylindrical shell 160 (which, in one embodiment, may preferably be the outer race for the needle bearings 159). An annular layer 162 of a compliant elastomeric material is attached to cylindrical shell 160, with the annular layer 162 providing a compliant exterior surface 164 to the roll segment 150 that faces away from the support spindle 151. Because of needle bearings 159, the cylindrical shell 160 and its associated annular layer 162 and compliant exterior surface 164 can rotate about an axis of rotation that preferably extends through the length of the support spindle 151.

The movable pistons 153 include ends 155 that bear against the interior surfaces 157 of the inner cylindrical bodies 156 of the roll segments 150. In the depicted embodiment, the interior surface 157 of each roll segment 150 is acted on by one of the movable pistons 153. It should, however, be understood that each roll segment 150 could be acted on by more than one movable piston in some alternative designs. In other designs, the interior surfaces 157 of two or more roll segments 150 may be acted on by a single movable piston 153.

During operation, the fluid chamber 152 preferably has a fixed volume that does not change in response to the lamination pressures exerted on the fluid 154 in the fluid chamber 152 through the roll segments 150 and pistons 153. Further-more, it may be preferred that the fluid 154 be incompressible under the normal operating pressures.

As a result, while the roll segments 150 move relative to the support spindle 151 to follow the contours of a surface to which film is being laminated, the movable pistons 153 can also move relative to the support spindle 151. The laminating force creates pressure in the fluid 154 in the fluid chamber 152, which is then distributed to the all of the roll segments 150 through the fluid 154 and pistons 153. Because the volume of the fluid chamber 152 is preferably fixed and the fluid 154 is preferably incompressible, the mean position of the moveable pistons 153 relative to the support spindle 151 preferably remains constant. In other words, each movement of one or more pistons 153 in one direction must be balanced by an equal movement of one or more pistons in the opposite direction. Consequently, the roll segments 150 contact each region of an uneven or undulating surface while preferably maintaining uniform contact forces between the different roll segments 150.

The compliant exterior surfaces 164 of the roll segments 150 have a width measured along the length of the support spindle 151. It may be preferred that adjacent roll segments 150 be closely spaced along the support spindle 151. For example, it may be preferred that the compliant exterior surfaces 164 of adjacent roll segments 150 are spaced apart from each other along the length of the support spindle 151 by a distance that is equal to or less than the width of the compliant exterior surfaces of the adjacent roll segments. Some minimal spacing between the annular layers 162 of compliant elastomeric material (and the compliant exterior surfaces 164 formed thereon) between adjacent roll segments 150 may be preferred to compensate for the lateral expansion (i.e., in the direction of the length of the support spindle 151) that may occur under lamination pressures. In the absence of spacing between the roll segments 150, expansion of the layer 162 may inhibit independent movement of the roll segments 150 as they attempt to comply with undulations and irregularities in the surface during lamination.

In some instances, the junctions between adjacent roll segments 150 may leave lines in the film lamination where the film is not completely wet-out or adhered to the surface. In such instances, it may be preferred to follow the initial lamination device 140 with a second lamination device (of the same or different construction) to wet-out or adhere the film to the surface along those lines. For example, the second lamination device may be a second roll with roll segments as described herein, where the roll segments are offset laterally from those in the initial lamination device.

The lamination device with roll segments depicted in FIGS. 6 & 7 and described herein is only one embodiment of a lamination device according to the present invention. One alternative embodiment of a lamination device that may be used in connection with the present invention is depicted in FIG. 8 and employs one alternative for biasing the different roll segments in the lamination direction.

Figure 8:
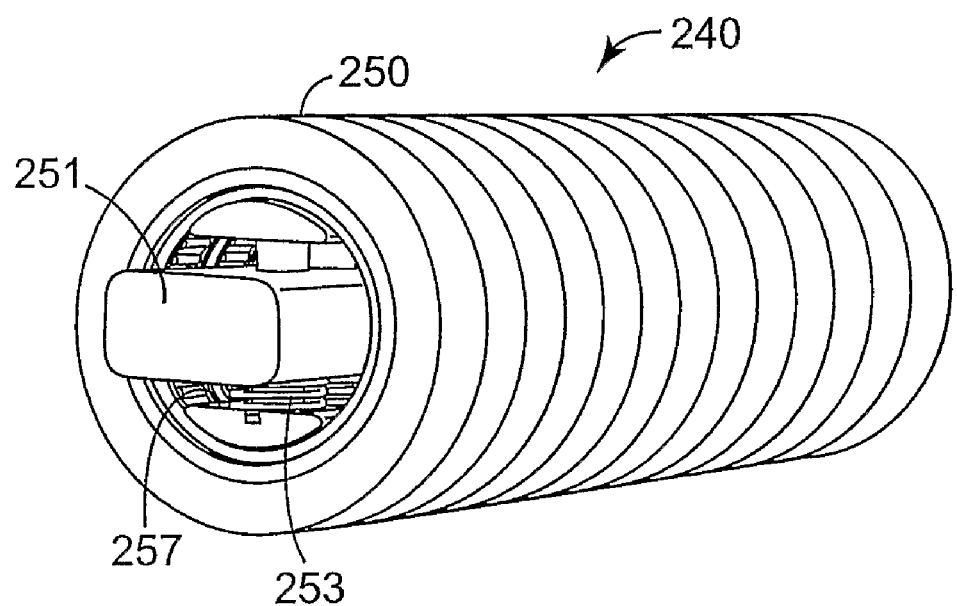
FIG. 8 is a perspective view of an alternative lamination device according to the present invention.

The lamination device 240 of FIG. 8 includes biasing members 253 extending outward from the support spindle 251, wherein an outer end of each biasing member 253 acts on the interior surface 257 of at least one roll segment 250 in a manner similar to the movable pistons 153 of the embodiment depicted in FIGS. 6 & 7.

The embodiment of FIG. 8 uses helical springs as the biasing members 253, although equivalent structures may be used, e.g., elastomeric plugs, individual hydraulic pistons, etc. The biasing members 253 may preferably be preloaded. In addition, the biasing members 253 may be designed such that deflection from the initial position only slightly increases the spring force of the biasing member 253 from its initial preloaded value.

Unlike the embodiment of FIGS. 6 & 7, where the pressure of the fluid 154 in the fluid chamber 152 can accommodate a variety of lamination pressures without adjustment, in the embodiment of FIG. 8, the biasing members 253 must typically be replaced to compensate for different lamination pressures.

Figure 9:
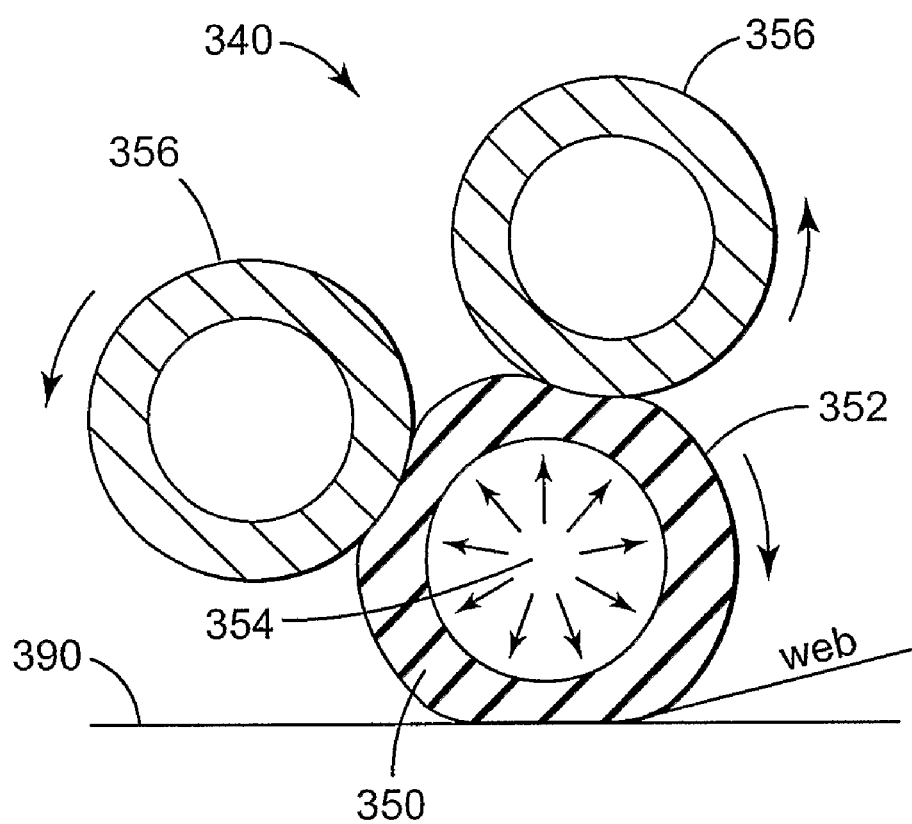
FIG. 9 is a cross-sectional diagram of a lamination device including a flexible, pressurized bladder and rigid backup rolls.

There are other exemplary embodiments that include variations of lamination devices with or without roll segments to provide lamination zones across the width of a web. For example, as shown in FIG. 9, the lamination device 340 may include a pressurized bladder roll 350 having an outer compliant surface 352 and an internal bladder member 354. Pressure can be applied to this kind of roll segment using rigid backup rolls 356 that are downward bearing on the bladder roll 350 to provide the lamination forces. Undulations in the surface 390 are compensated for by deflection of the bladder roll 350.

Figure 10:
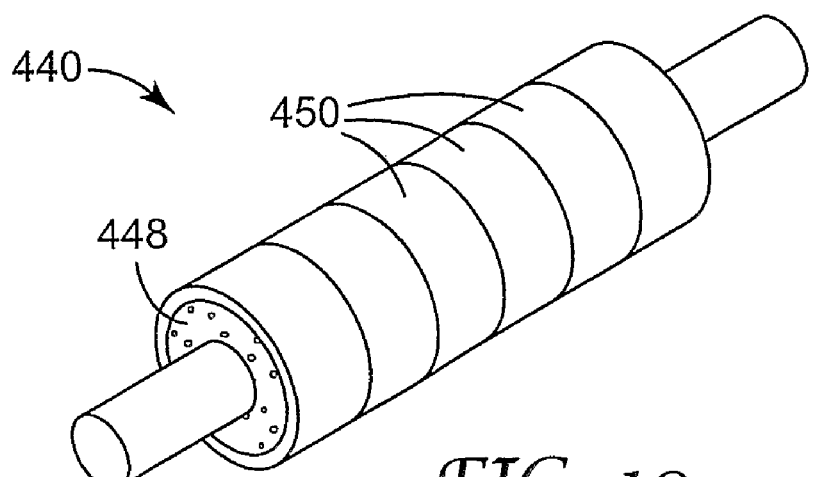
FIG. 10 is a perspective view of a lamination device including a resilient core and segmented shell.

Another example, as shown in FIG. 10, is a lamination device 440 roll including a soft resilient core 448 constructed of, e.g., foam rubber. The core 448 is covered by separate roll segments 450 arranged along the length of the core 448, where the roll segments 450 are in the form of a harder material (e.g., a higher durometer rubber, etc.). This design can provide reasonably uniform high pressure at the lamination front for good lamination.

Figure 11A:
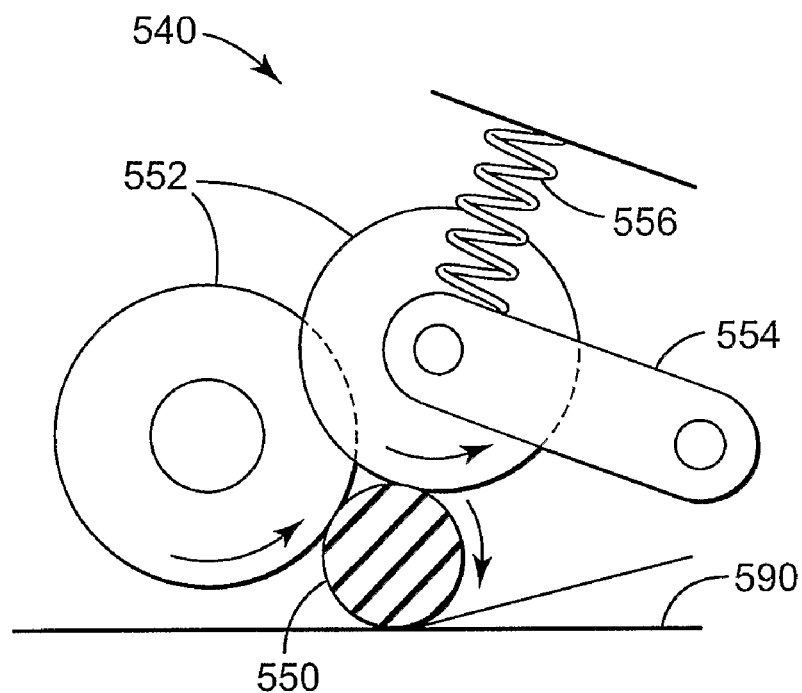
FIG. 11A is an end view of a lamination device including interleaved staggered discs and a flexible laminating roll.
Figure 11B:
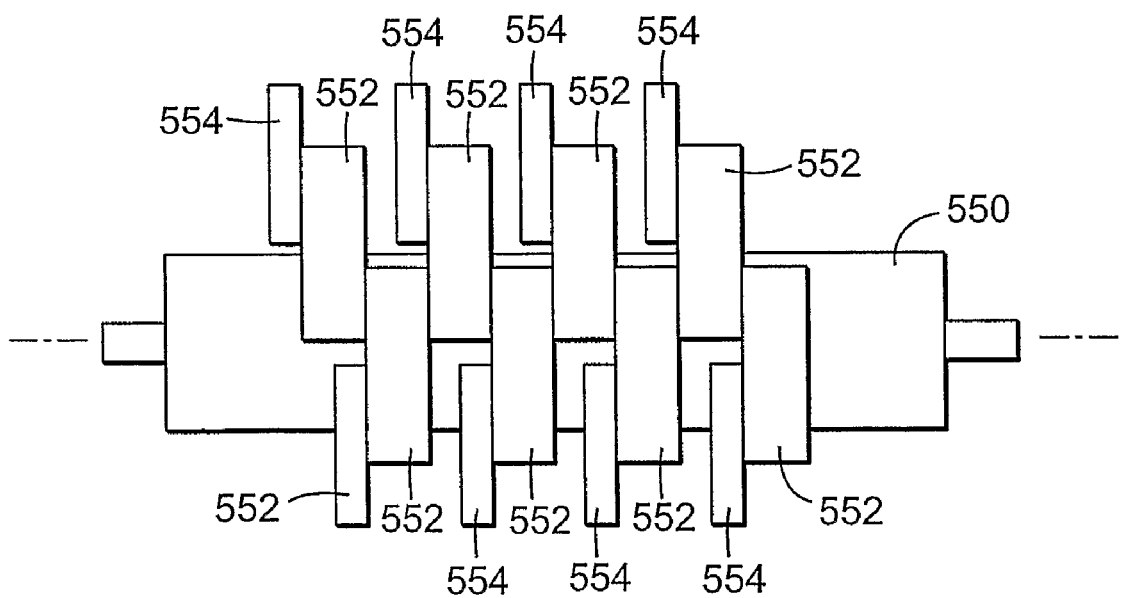
FIG. 11B is top view of the lamination device of FIG. 11A.

Yet another example of a lamination device 540 is depicted in FIGS. 11A & 11B. The lamination device 540 includes a flexible roll 550 that is forced against the lamination surface 590 by interleaved, staggered discs 552 that are biased against the flexible roll 550 towards the surface 590. In the depicted embodiment, the discs 552 are mounted on arms 554 with the biasing force provided by biasing members 556 that operate on the arms 554. It may be preferred that the outermost arms 554 on each end of the lamination device 540 be fixed, with the intermediate arms 554 allowed to rotate while being acted on by the biasing members 556. The biasing members 556 may include, e.g., mechanical springs, elastomeric members, hydraulic pistons, etc. Alternatively, the biasing force on the flexible roll 550 may be provided using discs in the form of spring sleeves as described in U.S. Pat. No. 4,047,445 (Anderson).

Interleaving of the discs 552 may be preferred to provide room for the arms 554 on which the discs 552 are mounted. The flexible roll 550 is preferably capable of deformation such that it can conform to undulations in the surface 590 while preferably providing high lamination pressures due to its small contact patch. Examples of suitable materials for flexible roll 550 may include, but are not limited to polyarethanes, polytetrafluoroethylene (TEFLON), elastomeric coated metal bars, etc.

Figure 12:
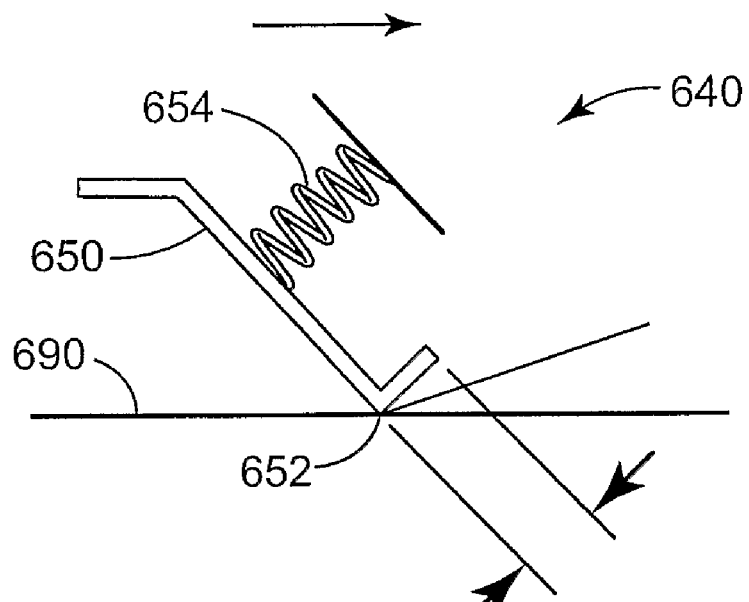
FIG. 12 depicts a lamination device including spring-loaded blades.

Still another exemplary lamination device 640 is depicted in FIG. 12 and includes a relatively stiff, resilient blade 650 that can be arranged along a lamination front. The blade 650 preferably includes an edge 652 that forms the lamination front. One or more biasing members 654 may be used to provide a biasing force that urges the edge 652 towards the lamination surface 690. The biasing members 654 may include, e.g., mechanical springs, elastomeric members, hydraulic pistons, etc. Alternatively, the blade 650 itself may provide the biasing force for lamination. The stiffness of the blade 650 may be adjusted by separating the blade 650 from the end 653 towards the edge 652 at intervals across its width (i.e., into the page in the view seen in FIG. 12).

In some embodiments, multiple blades 650 may be aligned across the lamination front (rather than just one blade). In such an embodiment, a gap may appear between adjacent blades. The lamination gaps may preferably be addressed by, e.g., oscillating the blades 650 across the width of the web being laminated, using multiple sets of blades offset across the width of the film (such that the lamination gaps are not aligned), etc.

Figure 13:
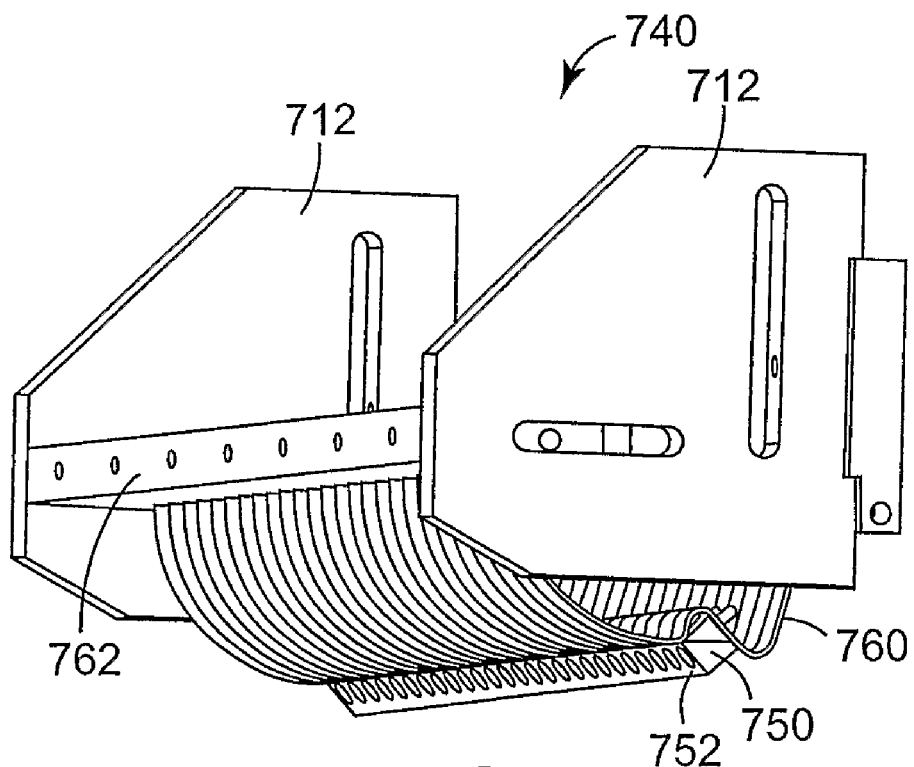
FIG. 13 is a perspective view from one end of a lamination device including leaf springs and a compliant member for lamination.
Figure 14:
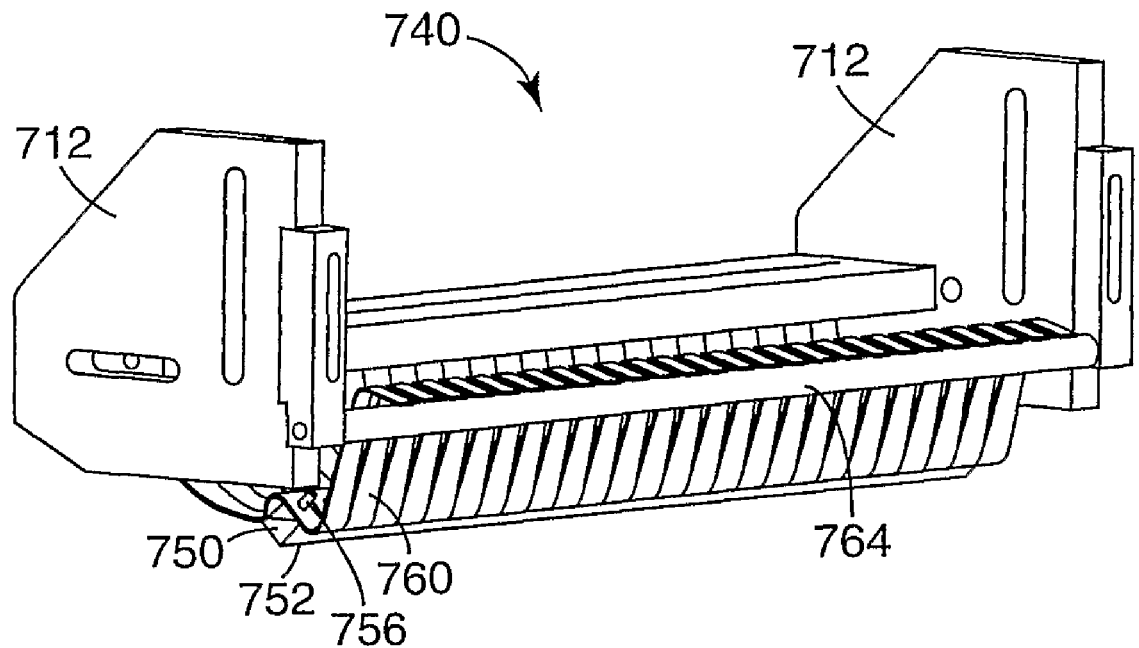
FIG. 14 is a different perspective view of the lamination device of FIG. 13.
Figure 15:
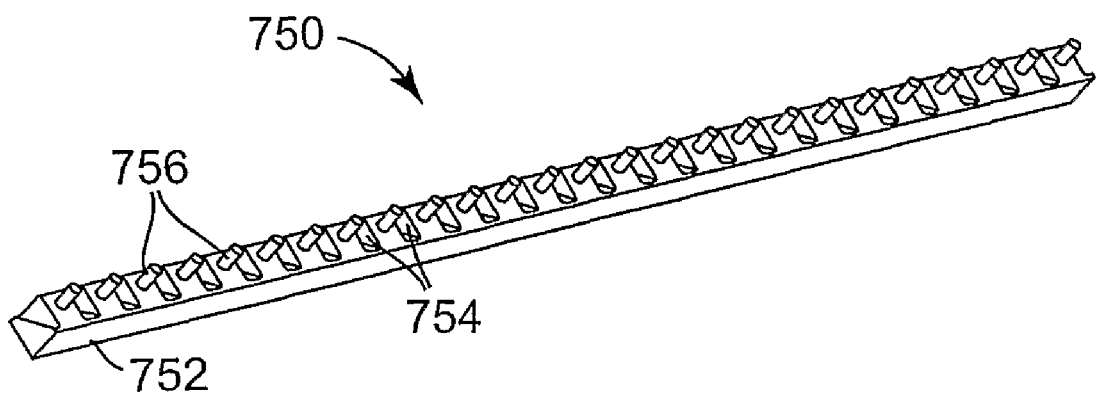
FIG. 15 is a downward looking perspective view of a compliant member used in the lamination device of FIGS. 13 & 14.

Yet another exemplary embodiment of a lamination device 740 that may be used in connection with the present invention is depicted in FIGS. 13-15. The lamination device 740 may preferably provide a relatively uniform lamination forces using a compliant member 750 that is forced in the lamination direction using biasing members in the form of leaf springs 760. The leaf springs 760 are preferably shaped and preloaded such that deflection of the leaf springs from their preloaded condition results in a relatively small increase in the lamination force.

In the depicted embodiment, the leaf springs 760 are shaped to extend between support bar 762 and stop 764 while still forcing the compliant member 750 in the lamination direction. The angular position of the support bar 762 with respect to frame members 712 can be adjusted (rotated) to vary the lamination force provided by the leaf springs 760. Outside of their connection to the support bar 762 and stop 764, the leaf springs 760 preferably act on the compliant member 750 independently of each other such that areas of the compliant member 750 located below the leaf springs 760 can move up or down to compensate for undulations in the surface to which a film is laminated.

The compliant member 750 (depicted alone in perspective view FIG. 15) preferably includes an edge 752 or other surface that acts on a film to be laminated. Using an edge 752 may be preferred to concentrate the lamination pressure. Compliance or flexibility of the compliant member 750 may be enhanced by providing notches 754 in the compliant member 750. The compliant member 750 also include optional posts 756 that may be used to align and secure the leaf springs 760 on the compliant member 750 (see, e.g., FIG. 14). The compliant member 750 may be made of any suitable material or combination of materials. Some exemplary suitable materials for compliant member 750 include, but are not limited to: elastomers, plastics, composite materials, cast polyurethane, etc.

Although not shown, a separate sheet member may be provided to reduce friction between edges 752 and the film being laminated to the surface. It may be preferred that the sheet member be constructed of, e.g., low surface energy materials such as polytetrafluoroethylene (TEFLON), ultra-high molecular weight polyethylene, etc.

Trimming Devices and Methods

The present invention may also provide trimming devices and methods of trimming films attached to surfaces. In preferred embodiments, the devices and methods of the present invention limit the depth of the trimming action to reduce or prevent marring of the surface underlying the film as a result of the trimming. For example, it may be preferred to limit the depth of the cutting to reduce or prevent marring of the surface.

It may also be preferred that, in trimming devices including a cutting edge, the attack angle formed between the cutting edge and the film be controlled such that the cutting is preferably in shear mode. Shear mode cutting may preferably not disturb the adhesive attachment between the film and the underlying surface adjacent the cut.

Figure 16:
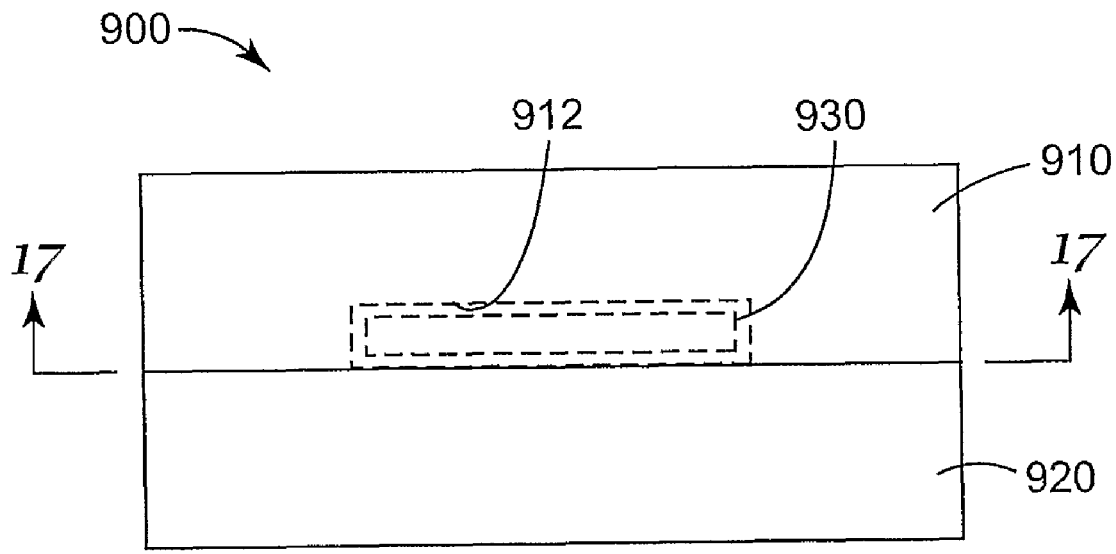
FIG. 16 is a top plan view of one exemplary embodiment of a trimming device according to the present invention.
Figure 17:
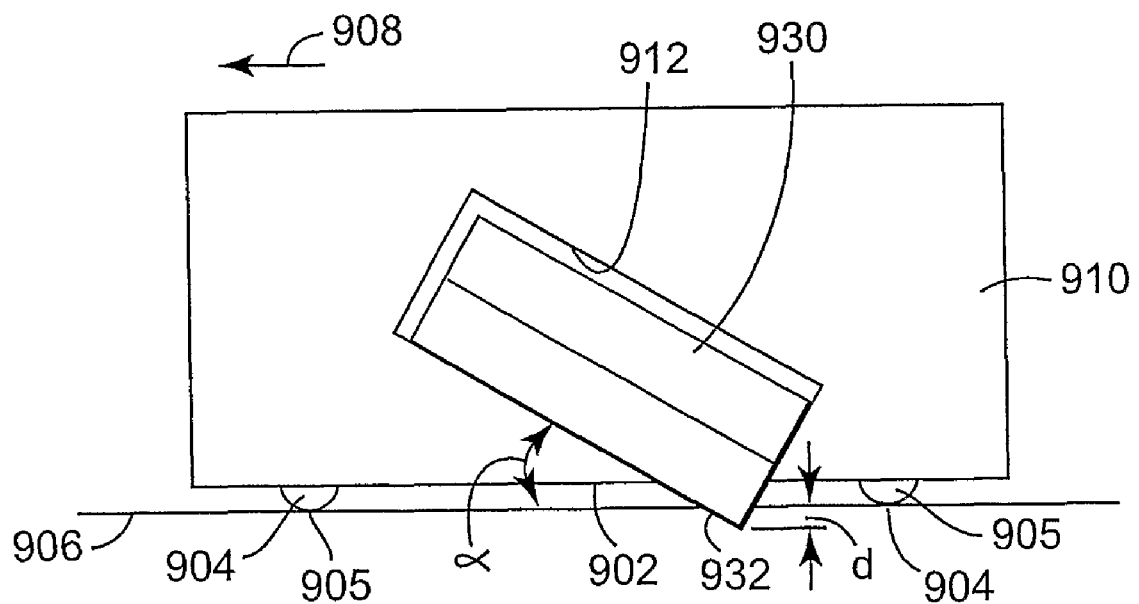
FIG. 17 is a cross-sectional view of the device of FIG. 16 taken along line 17-17 in FIG. 16.

One exemplary trimming device is depicted in FIGS. 16 & 17. The depicted trimming device 900 includes a blade support block 910 and a blade capture block 920. A blade 930 is preferably located within the support block 910 and the capture block 920.

The blade support block 910 preferably includes a cavity 912 that may be shaped to receive and retain a cutting blade 930 having a cutting edge 932. In the exemplary embodiment depicted in FIG. 17, the blade 930 is a conventional single-edged razor blade although any structure that provides a cutting edge 932 suitable for cutting polymeric films may be substituted.

The shapes of the cavity 912 and the blade 930 are preferably selected such that a predetermined portion of the cutting edge 932 extends out of the bottom surface 902 of the device 900. Although the device 900 may be designed such that the bottom surface 902 rest directly on the surface of the film, it may be preferred that the device 900 include standoffs 904 that extend out of the bottom surface 902 such that only the standoffs 904 and the blade 930 contact a film to be trimmed.

The cutting edge 932 of the blade 930 may preferably extend a distance d past the plane 906 defined by the standoffs 904 (see FIG. 17). The plane 906 defined by the standoffs 904 is the imaginary plane on which all of the terminal ends 905 of the standoffs 904 are located. The device 900 may preferably include two or more standoffs 904, in some instances three or more standoffs 904. The distance d may preferably be, e.g., equal to or less than the thickness of the film substrate to be cut (i.e., where the film substrate does not include the adhesive used to attach the film substrate to the surface). In other instances, it may be preferred that the distance d be equal to the thickness of the film substrate and at least a portion of the thickness of the adhesive used to attach the film to a surface.

Another optional feature depicted in FIG. 17 is the attack angle α (alpha) defined by the cutting edge 932 of the blade 930 and the plane 906 defined by the standoffs 904. It may be preferred for example, that the attack angle be selected to provide for shear mode cutting of a film. For example, it may be preferred that the attack angle be 45 degrees or less, more preferably 30 degrees or less.

In use, the trimming device 900 is placed on a film to be trimmed with the bottom surface 902 facing the film and the standoffs 904 (if provided) resting on the surface of the film. With the standoffs 904 resting on the film (or the bottom surface 902 of the device resting on the film if no standoffs are present), the cutting edge 932 is preferably penetrating into or through the film by the depth d. As the trimming device 900 is advanced in the direction of arrow 908 (see FIG. 17), the cutting edge 932 cuts the film, preferably in a shearing action.

As used herein and in the appended claims, the singular forms "a," "and," and "the" include plural referents unless the context clearly dictates otherwise. Thus, for example, reference to "a" or "the" component may include one or more of the components and equivalents thereof known to those skilled in the art.

Exemplary embodiments of this invention are discussed and reference has been made to some possible variations within the scope of this invention. These and other variations and modifications in the invention will be apparent to those skilled in the art without departing from the scope of the invention, and it should be understood that this invention is not limited to the exemplary embodiments set forth herein. Accordingly, the invention is to be limited only by the claims provided below and equivalents thereof.

The invention claimed is:

1. A film lamination apparatus for reducing lamination defects of adhesive-backed films during application to a surface, the film lamination apparatus comprising:
   a frame;
   a lamination device operably attached to the frame, wherein the lamination device defines a lamination front on the surface;
   one or more surface-engaging devices operably connected to the frame for directing the film lamination apparatus across the surface;
   a steering limit device operably associated with at least one of the one or more surface-engaging devices, the steering limit device limiting a degree to which the apparatus can be turned about a steering pivot point in response to a motive force applied to at least one of the one or more surface-engaging devices;
   wherein the steering pivot point is located along a line passing through an axis of the lamination front, but not within a width of the lamination front;
   a supply roll spindle supported by the frame, wherein the supply roll spindle is adapted to hold a roll of adhesive-backed film;
   a web path within the apparatus extending between the supply roll spindle and the lamination device; and
   a web tension control device located between the supply roll spindle and the lamination device.

2. An apparatus according to claim 1, wherein the lamination device includes:
   a plurality of roll segments arrayed along a length of a support spindle, wherein each roll segment of the plurality of roll segments rotates about the support spindle, and wherein each roll segment of the plurality of roll segments comprises an interior surface facing the support spindle and an exterior complaint surface facing away from the support spindle; and
   a plurality of biasing members extending outward from the support spindle, wherein an outer end of each biasing member of the plurality of biasing member acts on the interior surface of at least one roll segment of the plurality of roll segments.

3. A lamination device for use in the apparatus of claim 1, wherein the lamination device includes a flexible roll that is forced against the lamination surface by interleaved, staggered discs that are biased against the flexible roll.

4. A lamination device for use in the apparatus of claim 1, wherein the lamination device includes:
   a compliant member comprising a length and a contact surface extending along the length of the compliant member; and
   a plurality of biasing members arranged along the length of the compliant member, wherein each biasing member of the plurality of biasing members acts on the compliant member such that the contact surface is biased in a direction generally transverse to the length of the compliant member, and wherein each biasing member acts on the compliant member independently of the other biasing members.

5. An apparatus according to claim 4, wherein each biasing member is selected from a group including a leaf spring, a helical spring, a resilient elastomeric body, or combinations thereof.

6. A film lamination apparatus for reducing lamination defects of films during application to a surface, the film lamination apparatus comprising:
   a frame;
   two wheels supporting the frame relative to the surface, the two wheels having a common axis of rotation;
   a steering system associated with the two wheels and establishing a steering pivot point for the apparatus, the steering pivot point being located along the common axis of rotation;
   a lamination device operably attached to the frame, wherein the lamination device defines a lamination front on the surface;
   wherein the steering pivot point is located along a line passing through an axis of the lamination front, but not within a width of the lamination front; and
   a supply roll spindle supported by the frame, wherein the supply roll spindle is adapted to hold a roll of film.

7. An apparatus according to claim 6, wherein the lamination device includes:
   a support spindle;
   a plurality of roll segments arrayed along a length of the support spindle, wherein each roll segment of the plurality of roll segments rotates about the support spindle, and wherein each roll segment of the plurality of roll segments comprises an interior surface facing the support spindle and an exterior compliant surface facing away from the support spindle;
   a plurality of movable pistons extending outward from the support spindle, wherein an outer end of each movable piston of the plurality of movable pistons acts on the interior surface of at least one roll segment of the plurality of roll segments; and
   a fluid chamber comprising a fixed volume and fluid located therein, wherein at least a portion of the fluid chamber is located within the support spindle, and wherein pressure of the fluid located within in the fluid chamber biases the plurality of movable pistons in a direction towards the interior surfaces of the plurality of roll segments during lamination.

8. An apparatus according to claim 7, wherein each roll segment of the plurality of roll segments rotates about the support spindle independently of the other roll segments.

9. An apparatus according to claim 7, wherein each roll segment of the plurality of roll segments comprises an exterior compliant surface width measured along the length of the support spindle, and wherein the exterior compliant surfaces of adjacent roll segments are spaced apart from each other along the length of the support spindle by a distance that is equal to or less than the exterior compliant surface width of one of the adjacent roll segments.

10. An apparatus according to claim 1, further comprising:
    a drive system including a motor connected to at least one of the one or more surface-engaging devices for selectively applying the motive force to the at least one of the one or more surface-engaging devices.

11. An apparatus according to claim 10, wherein the drive system is configured to effectuate driven movement of the apparatus in only a single direction.

12. An apparatus according to claim 10, wherein the one or more surface-engaging devices includes first and second driven wheels each acted upon by the drive system.

13. An apparatus according to claim 12, wherein the first and second driven wheels are rotatable about a common axis of rotation, and further wherein the common axis of rotation intersects the steering pivot point.

14. An apparatus according to claim 1, wherein the roll of adhesive-backed film includes an adhesive-backed film web and a liner provided on the film web, the apparatus further comprising:

an intermediate roller located along the web path between the supply roll spindle and the lamination device; and
a rewind spindle positioned along a liner path;
wherein the liner path extends from the intermediate roller and the rewind spindle, and further wherein the apparatus is configured such that the film web separates from the liner at the intermediate roller, with the film web progressing from the intermediate roller to the lamination front and the liner progressing from the intermediate roller to the rewind spindle.

* * * * *